United States Patent
Mason

(10) Patent No.: US 10,087,362 B2
(45) Date of Patent: Oct. 2, 2018

(54) TREATMENT FLUIDS COMPRISING VISCOSIFYING AGENTS AND METHODS OF USING THE SAME

(71) Applicant: SABRE INTELLECTUAL PROPERTY HOLDINGS LLC, Slingerlands, NY (US)

(72) Inventor: John Mason, Odessa, TX (US)

(73) Assignee: SABRE INTELLECTUAL PROPERTY HOLDINGS, Slingerlands, NY (US)

( * ) Notice: Subject to any disclaimer, the term of this patent is extended or adjusted under 35 U.S.C. 154(b) by 476 days.

(21) Appl. No.: 14/595,459

(22) Filed: Jan. 13, 2015

(65) Prior Publication Data

US 2015/0197686 A1    Jul. 16, 2015

Related U.S. Application Data

(60) Provisional application No. 61/928,319, filed on Jan. 16, 2014.

(51) Int. Cl.

| | |
|---|---|
| C09K 8/68 | (2006.01) |
| C09K 8/60 | (2006.01) |
| C09K 8/512 | (2006.01) |
| C09K 8/514 | (2006.01) |
| C09K 8/588 | (2006.01) |
| C09K 8/90 | (2006.01) |
| C09K 8/524 | (2006.01) |
| C09K 8/528 | (2006.01) |

(52) U.S. Cl.
CPC .............. *C09K 8/605* (2013.01); *C09K 8/512* (2013.01); *C09K 8/514* (2013.01); *C09K 8/588* (2013.01); *C09K 8/68* (2013.01); *C09K 8/685* (2013.01); *C09K 8/90* (2013.01); *C09K 8/524* (2013.01); *C09K 8/528* (2013.01); *C09K 2208/26* (2013.01); *C09K 2208/28* (2013.01); *C09K 2208/32* (2013.01)

(58) Field of Classification Search
CPC ............ C09K 2208/26; C09K 2208/28; C09K 2208/32; C09K 8/512; C09K 8/514; C09K 8/524; C09K 8/528; C09K 8/588; C09K 8/605; C09K 8/68; C09K 8/685; C09K 8/90

See application file for complete search history.

(56) References Cited

U.S. PATENT DOCUMENTS

| | | | |
|---|---|---|---|
| 2010/0160449 A1* | 6/2010 | Rovison, Jr. ........... | A01N 37/02 514/714 |
| 2010/0239679 A1 | 9/2010 | Greene et al. | |
| 2011/0056752 A1 | 3/2011 | Young et al. | |
| 2012/0285693 A1 | 11/2012 | Mirakyan et al. | |
| 2012/0289436 A1* | 11/2012 | Woodward ............ | C07F 9/5407 507/111 |
| 2013/0029884 A1 | 1/2013 | Malchesky et al. | |
| 2013/0213657 A1* | 8/2013 | Dobson, Jr. .............. | C09K 8/24 166/308.5 |

OTHER PUBLICATIONS

PCT International Application No. PCT/US2015/011338, International Search Report and Written Opinion dated Jun. 10, 2015.

\* cited by examiner

*Primary Examiner* — Alicia Bland

(74) *Attorney, Agent, or Firm* — Pillsbury Winthrop Shaw Pittman LLP

(57) ABSTRACT

Methods include introducing a treatment fluid into a wellbore penetrating a subterranean formation, the treatment fluid including a polymer gel comprising a water-soluble polymer, a biocidal agent in an amount sufficient to viscosify the treatment fluid, and an aqueous base fluid.

21 Claims, No Drawings

TREATMENT FLUIDS COMPRISING VISCOSIFYING AGENTS AND METHODS OF USING THE SAME

RELATED APPLICATIONS

This application claims priority to application Ser. No. 61/928,319, filed Jan. 16, 2014, which application is expressly incorporated herein by reference in its entirety.

TECHNICAL FIELD

The present application relates to methods and compositions employed during various stages of oil recovery from subterranean formations, and more specifically to the use of treatment fluids comprising viscosifying agents in operations conducted throughout the lifespan of an oil-bearing formation.

BACKGROUND

Over the course of the oil recovery cycle from an oil-bearing formation, various operations are performed to facilitate and increase oil recovery. At the front end of the oil recovery cycle, access to oil-bearing strata may involve increasing the permeability of the formation through fracturing. In general, such treatments may be conducted by injecting a liquid, gas, or two-phase fluid down the wellbore at sufficient pressure and flow rate to fracture the subterranean formation. A proppant material, such as sand, fine gravel, sintered bauxite, glass beads, or the like, may also be introduced into the fractures to keep the fractures open after the fracturing pressure is released. Propped fractures provide larger flow channels through which an increased quantity of a hydrocarbon may flow, thereby increasing the productivity rate of the well. Fracturing fluids may employ polymer gel materials to enhance fluid viscosity to aid, inter alia, proppant transport, adequate fracture propagation while maintaining sufficient fracture width to admit proppant, and to reduce the leakage rate of the fracturing fluid into the formation.

Because fracturing operations generally employ large volumes of water it may be desirable, and even environmentally prudent, to employ any produced water, i.e. recovered water already present in the formation. Other produced waters that may be used include recycled water sources, such as waste water, and water from mining operations and landfill leachate. However, the use of produced water has been problematic due the presence of contaminants which can impede the performance of the polymer gels and viscosity reducers that are used in fracturing fluids. Many techniques have been developed to treat produced water so that it can be used to formulate a competent fracturing fluid including nano-filtration, electrocoagulation, and conventional filtration. These techniques tend to be costly and may present practical limitations due to their low throughput. For example, filtration rates may be so limited that there is an insufficient supply for continuous fracturing rates absent storing large volumes of fluid.

At the back end of the oil recovery cycle, operations have been developed to increase the life span of well productivity. To maximize the recovery of hydrocarbons from a reservoir, several methods may be implemented after the natural depletion stage is over. Secondary methods may comprise water or gas injection to help maintain reservoir pressure and ensure hydrocarbon flow to the production wells. The recovery factor after employing secondary methods often remains below 40% of the oil originally in place. At this point tertiary oil recovery methods may then be employed to reach recovery factors above 60%.

Polymer flooding is one such tertiary method (though it may be employed earlier in the oil recovery cycle) applicable over a wide range of reservoir conditions. In polymer flooding, a water-soluble polymer is dissolved in water to increase fluid viscosity typically forming a polymer gel which is introduced into the formation as a "slug," or continuously. The goal of introducing the polymer is to improve the sweep efficiency through the hydrocarbon reservoir while increasing production fluid to the wellbore. In a typical polymer flood, polymer is mixed and injected over an extended period of time until at least about 30% of the reservoir pore volume has been injected. When using a polymer gel as a slug it is typically followed by water flooding to drive the polymer gel and the oil bank in front of it toward the production wellbore. Alternatively the polymer can be fed continuously to maintain viscosity in the injection fluid to increase sweep efficiency. As with fracturing, the volumes of fluids employed make it desirable to re-use the aqueous portion recovered from the flooding process. However, the exposure of the polymer to the formation can sufficiently chemically alter the polymer making viscosity adjustment of the recovered aqueous fluids both necessary and material intensive, reducing the attractiveness of recycling the water phase in a cyclic flooding process. A further issue in a cyclic flooding process arises with recycling of the polymer. Typically, the polymer ages as it passes through the formation and such aging can cause the polymer to gain an affinity for hydrocarbons, making the separation of hydrocarbons from the polymer-laden fluid difficult.

Still further issues arise under certain formation conditions whereby the polymer can inhibit flow through the formation via polymer plugging of the injection wells, the formation, or both. One means to address polymer plugging employs concentrated chlorine dioxide solution to degrade the polymer. Other oxidants such as hydrogen peroxide, sodium persulfate, sodium hypochlorite, sodium peroxide, and sodium perborate have also been used for this purpose. Polymer plugging notwithstanding, typically the bulk polymer gel slug "breaks through" to the producing wells in a short period of time. The polymer gel may then be brought to the surface as part of the produced fluids. Typically the polymer gel is incorporated in an emulsion phase and a water phase of the produced fluids. While polymer gel capture in the produced fluids may be beneficial from the perspective of maintaining formation integrity, the presence of the polymer in production fluid can hamper separation of water and hydrocarbon. Additionally, the polymer gel present in produced fluids can plate out on production equipment, or "bake" on heater treater surfaces requiring its manual removal.

SUMMARY

In some aspects, embodiments disclosed herein provide methods comprising introducing a treatment fluid into a wellbore penetrating a subterranean formation, the treatment fluid comprising a polymer gel comprising a water-soluble polymer, a biocidal agent in an amount sufficient to viscosify the treatment fluid, and an aqueous base fluid.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

DETAILED DESCRIPTION

Embodiments disclosed herein provide methods and compositions that may facilitate the use of polymer gels in various subterranean operations, including fracturing and polymer flooding applications. In particular, embodiments disclosed herein provide for the use of viscosified treatment fluids in connection with both fracturing fluids/operations and as part of aqueous phase recycling in polymer flooding operations, while protecting against degradation of the polymer/polymer gel during such operations.

In accordance with observations disclosed herein, it has been determined that a polymer gel's stability toward certain biocidal agents depends, at least in part, on previous exposure to polymer gel-damaging reagents prior to exposure to biocidal agents. For example, a "virgin" sample of polyacrylamide (or similar polymers employed in polymer gels) i.e. not exposed to a formation or formation water, may be formulated into a stable polymer gel, in the presence of excess residual oxidizing biocidal agents. Such stability to these reagents is not observed with "aged" polymers that may have been exposed to a formation or formation water, for example. This behavior of aged polymers is consistent with typical use of reagents, such as chlorine dioxide (dual use biocide and oxidizing breaker), as a reagent to ameliorate formation polymer plugging. Without being bound by theory, it has been postulated that low-valent metal ions, which may be present in a formation or in formation water, especially in reducing formations such as those rich in hydrogen sulfide, may chemically alter the polymer and render it susceptible to subsequent attack by oxidizing biocides, such as chlorine dioxide.

Embodiments disclosed herein provide a means whereby treatment fluids, such as fracturing and/or polymer flooding fluids, may be formulated with produced water, although such fluids are not so limited by the use of such water sources. In particular embodiments, after exposure of produced water to excess chlorine dioxide, it has been found that a stable polymer gel can be prepared without the need for expensive and time consuming filtration processes typically employed in the art. That is, it was not previously recognized that oxidized metal species, such as ferric ion (Fe(III)) are substantially innocuous to polymer gel stability. Thus, great time and expense was expended to rid formation water (or other water sources) of all iron and similar damaging metal ions, such as manganese, nickel, lead, and tin. In accordance with embodiments disclosed herein, water sources containing low-valent metals (or even absent such metals) may be pre-treated with chlorine dioxide or other oxidant and used in unfiltered form to provide a stable polymer gel. The chlorine dioxide employed may be used in sufficient excess to provide a treatment fluid with biocidal capacity and/or to provide a degree of protection against damage upon exposure to a formation. Methods employing such treatment fluids may also benefit from a pre-treatment of the formation with reagents to further protect the polymer gel from breakdown and thus, reduce formation plugging and equipment fouling. The treatment fluids employed in methods disclosed herein may be formulated on the fly or continuously at any desired flow rate, which may be particularly beneficial in a fracturing operation.

Chlorine dioxide, in particular, may also promote the separation of hydrocarbon from water, and facilitate direct treatment fluid reuse. As disclosed herein, a produced fluid from a polymer flood, for example, may be treated with chlorine dioxide enhancing hydrocarbon separation from water. Moreover, such treated water may be readily recycled in a cyclic flooding process by adding fresh polymer to the chlorine dioxide treated aqueous fraction to achieve a target viscosity. Advantageously, the amount of polymer needed in a cyclic flooding process may be reduced by about 25% to about 75%, providing a substantial materials cost savings in the overall operation.

Other biocidal agents, both oxidizing and non-oxidizing may exhibit similar benefits as those demonstrated with chlorine dioxide. As disclosed herein, various biocidal agents may serve to aid viscosification of, for example, hydroxypropyl guar (HPG)-based treatment fluids.

In some embodiments, there are provided methods comprising introducing a treatment fluid comprising a first polymer gel into a subterranean formation to generate a production fluid comprising an aqueous portion and a hydrocarbon portion, treating the aqueous portion of the production fluid with chlorine dioxide to separate additional hydrocarbons from the aqueous portion, and adjusting the viscosity of the treated aqueous portion prior to introducing the treated aqueous portion back into the subterranean formation.

Treatment fluids may be used in a variety of subterranean treatments. As used herein, the term "treatment," refers to any subterranean operation that uses a fluid in conjunction with a desired function or purpose. The term "treatment," does not imply any particular action by the fluid. Examples of common subterranean treatments include, without limitation, drilling operations, pre-pad treatments, fracturing operations, perforation operations, pre-flush treatments, after-flush treatments, sand control treatments (e.g., gravel packing), acidizing treatments (e.g., matrix acidizing or fracture acidizing), diverting treatments, cementing treatments, and wellbore clean-out treatments. For example, in certain fracturing treatments, generally a treatment fluid (e.g., a fracturing fluid or a "pad fluid") is introduced into a wellbore that penetrates a subterranean formation at a sufficient hydraulic pressure to create or enhance one or more pathways, or fractures, in the subterranean formation. These cracks generally create a highly conductive channel with deep reach into the reservoir, to improve hydrocarbon production and increase the "effective permeability" of that portion of the formation. While some embodiments disclosed herein are directed to such fracturing operations, treatment fluids disclosed herein may be used in any subterranean operation wherein a polymer gel or viscous fluid may be useful during the operation.

The term "gel," and related terms such as "crosslinked gel," or "polymer gel," as used herein, refers to a semi-solid, jelly-like state assumed by some colloidal dispersions. Polymer gels disclosed herein may be formed via hydration water-soluble polymers. The viscosity of such gels may be optionally altered by the presence of a crosslinking agent.

The term "production fluid," as used herein refers to fluids that may be recovered from production wells or any recycled water sources such as waste water or water from mine operation or landfill leachate. Such fluids may include those generated by stimulation treatments, flooding treatments, and the like. In particular embodiments, production fluids comprise fluids recovered via polymer flooding operations. Production fluids may comprise both hydrocarbons which are desired for recovery, as well as other fluids, such as aqueous treatment fluids employed in connection with stimulation/flooding operations.

In a flooding operation, methods disclosed herein may provide a treatment fluid comprising a first polymer gel wherein the treatment fluid is introduced into a subterranean formation to generate a production fluid comprising an aqueous portion and a hydrocarbon portion. The production fluid may include some phase separation of hydrocarbon and water. Where ready phase separation occurs, the bulk of the hydrocarbon layer may be skimmed off prior to any further treatments, although this is not necessary. After any optional skimming, methods disclosed herein may include treating the predominantly aqueous portion of the production fluid with chlorine dioxide to separate additional hydrocarbons from the aqueous portion. In accordance with observations disclosed herein, such additional hydrocarbon recovery may be substantial, including as much as an additional about 20% hydrocarbon trapped in combined aqueous/emulsion phase. In a cyclic flooding process, where the water phase is recycled, methods disclosed herein may include adjusting the viscosity of the treated aqueous portion prior to introducing the treated aqueous portion back into the subterranean formation.

In an exemplary embodiment, a produced fluid may be treated with sufficient chlorine dioxide to achieve a residual concentration of about 0.1 to about 10 mg/L of $ClO_2$. The fluid may then be allowed to separate as it passes through a free water knock out, heater treater and/or stilling/skim tanks with oil being pulled off the top and solids off the bottom. A slip stream of chlorine dioxide treated aqueous layer may then be used to hydrate the polymer. The hydrated polymer can be added back to the main produced water stream with any make up water required. Overall, methods disclosed herein may provide increased oil recovery from the produced fluids, higher efficiency of polymer performance and utilization, and minimization of formation damage.

In some embodiments, it may not be necessary to carry residual chlorine dioxide. That is, after a sufficient amount of chlorine dioxide has been added to effect phase separation, no further chlorine dioxide need be added. Because the hydrocarbon content remaining in the aqueous phase is readily quantified, one skilled in the art will be able to determine the amount of chlorine dioxide needed without leaving a significant amount of residual reagent.

In some embodiments, methods disclosed herein may further comprise a step of introducing a pre-treatment fluid in the subterranean formation prior to placing the treatment fluid in the formation, wherein the pre-treatment fluid comprises an oxidant. Pre-treatment fluids may be employed to remove, or otherwise render innocuous, polymer damaging formation components. For example, a formation rich in iron, manganese, tin, and other low-valent metal ions may be pre-treated to deal with these components. In some embodiments, a pre-treatment may be optionally employed for removal of the damaging components from the formation. For example, metal scavenging chelants may be employed to remove harmful metal ions. In some embodiments, pre-treatments may be used to ameliorate the reducing capacity of the formation. For example, a formation rich in hydrogen sulfide may consume any residual protective chlorine dioxide. A pre-treatment to neutralize or remove hydrogen sulfide can help maintain the oxidized form of damaging metal ions where hydrogen sulfide and other reducing agents may regenerate the low-valent oxidation states. A particular pre-treatment useful in connection with embodiments disclosed herein provides an oxidant such as described in U.S. Patent Application No. 2012/0244228, wherein the oxidant is added in a treatment fluid entering the formation ahead of the polymer wherein the oxidant specifically targets reduced metals and sulfides.

In some embodiments, the treatment fluid, especially those in a flooding operation, may be introduced distal to a wellbore, while in other embodiments the treatment fluid may be introduced through a portion of the wellbore itself. In a polymer flood for example, the treatment fluid comprising the polymer gel may be introduced distal, i.e. about 30 feet, or about 20 feet or about 10 feet, or about 5 feet from the wellbore. One skilled in the art will appreciate that the exact distance from the wellbore that one may introduce a polymer gel as part of flooding operation may depend on the various conditions of the formation including, inter alia, formation permeability, whether the formation has undergone any previous stimulation or fracturing treatments, and the like. One skilled in the art will also recognize that the effectiveness of moving the polymer out to farther distances from the wellbore may render the flood ineffective as it becomes more difficult to actually propagate the polymer through the formation. One of ordinary skill in the art will be able to determine an appropriate distance at which a polymer gel slug may be introduced. In some embodiments, the location is the same as where injection water is located.

In some embodiments, methods disclosed herein may further comprise performing additional flooding operations selected from the group consisting of a gas flood, a wet acid gas flood, a caustic flood, a surfactant flood, a foam flood, a steam flood, a carbon dioxide, and a water flood. In some embodiments, a polymer flood may be performed before or after any of the aforementioned additional flooding operations. In particular embodiments, a polymer flood may be followed by a water flood to push a polymer gel slug and any oil bank to be recovered toward the production well. In some embodiments, the polymer flood may be used in conjunction with a carbon dioxide flood. In some embodiments, the polymer flood may be used in conjunction with a carbon dioxide and a surfactant flood.

In some embodiments, methods disclosed herein may further comprise separating solids from the treated aqueous portion, i.e. after chlorine dioxide treatment. Numerous solids may drop out of hydrocarbon and/or water phases upon treatment with chlorine dioxide. Such solids may be removed by conventional techniques known to those skilled in the art, including filtration, floatation, gravimetric separation, skimming of the fluid layers, and the like.

In some embodiments, methods disclosed herein provide treatment fluids that comprise a polymer gel, which polymer gel comprises a water-soluble polymer class selected from the group consisting of a polyacrylate, a polyacrylamide, a cellulose, a xanthan gum, a guar gum, a diutan, a wellan, a glucan, a glycan, a dextran, an alginate, a curdlan, a pullulan, and combinations thereof and derivatives thereof. Any competent hydratable polymer capable of providing the requisite viscosity/transport properties may be used. The water-soluble polymer may be naturally-occurring, synthetic, or a combination thereof. The water-soluble polymers also may be cationic, anionic, nonionic, amphoteric, or a combination thereof. Suitable polymers may include, but are not limited to, polysaccharides, biopolymers, and/or derivatives thereof that comprise one or more of monosaccharide units, such as galactose, mannose, glucose, xylose, arabinose, fructose, glucuronic acid, or pyranosyl sulfate. Examples of suitable polysaccharides include, but are not limited to, guar gum and derivatives (e.g., underivatized guar, hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethyl cellulose), xanthan, scleroglucan, diutan, locust bean gum, tara, konjak, tamarind, starch, karaya, tragacanth and carrageenan. Hydratable synthetic polymers and copolymers which comprise, for example, hydroxyl, cis-hydroxyl, carboxyl, sulfate, sulfonate, amino and/or amide functional groups may be suitable gelling agents. In some such embodiments, such polymers and copolymers may comprise polyacrylate, polymethacrylate, polyacrylamide, maleic anhydride, methylvinyl ether polymers, polyvinyl alcohol and polyvinylpyrrolidone. In particular, water-soluble polymers may be selected and/or synthetically designed based on (1) their ability to provide targeted rheological properties, and (2) and their compatibility with chlorine dioxide.

In some embodiments, the water-soluble polymer is selected from the group consisting of polyacrylamide, partially hydrolyzed polyacrylamide, sulfonated polyacrylamide, methyl cellulose, hydroxyethyl cellulose, hydroxypropyl cellulose, carboxymethylcellulose, carboxymethylhydroxyethylcellulose, sulfonated carboxymethylcellulose, sulfonated carboxymethyl-hydroxyethylcellulose, sulfonated hydroxyethylcellulose, sulfonated methylhydroxypropyl-cellulose, sulfonated methylcellulose, sulfonated ethylcellulose, sulfonated propylcellulose, sulfonated ethylcarboxymethylcellulose, sulfonated methylethylcellulose, sulfonated hydroxyl-propylmethylcellulose, guar, hydroxypropylguar, succinoglycan, scleroglucan, and combinations thereof. In particular embodiments, fracturing and flooding operations may employ polyacrylamides, partially hydrolyzed polyacrylamides, hydroxypropylguar, or hydroxyethylcellulose.

In some embodiments, the amount of water-soluble polymer employed in a treatment fluid used in a polymer flood may be in a range from about 10 mg/L to 500 mg/L for friction reduction, including from about 25 mg/L to 150 mg/L. In some embodiments, the amount of water soluble polymer employed in a treatment fluid used in a polymer flood may be in a range from about 500 mg/L to about 10,000 mg/L for viscosity modification, including from about 750 mg/L to about 2500 mg/L.

During flooding operations, in particular, the treatment fluid further may comprise chlorine dioxide at the beginning of the flooding cycle. In a cyclic process, the produced fluids may be treated with an excess of chlorine dioxide in each cycle, including the initial cycle. In some embodiments, the amount of chlorine dioxide in the treatment fluid at the outset of a cyclic flooding cycle may be in a range from about 10 parts per million to about 3,000 mg/L. The exact amount may depend on the exact nature of the formation, including factors such as, inter alia, the concentration of damaging components, both chemical and biological (e.g. bacteria etc.). In some embodiments, the amounts of chlorine dioxide needed may vary with each cycle as the remaining damaging components in the formation may be sufficiently depleted in later iterations.

In some embodiments, methods disclosed herein employ a treatment fluid which may comprise an aqueous base comprising production water, although as mentioned methods disclosed herein are not so limited. Thus, treatment fluids disclosed herein may comprise any base fluid. Typically a base fluid will be aqueous based, although fracturing fluids, in particular, are not so limited. Suitable base fluids for use in the treatment fluids disclosed herein may comprise aqueous base fluids and non-aqueous base fluids. Suitable aqueous base fluids that may be used in the treatment fluids may include, without limitation, fresh water, salt water, brine, seawater, production water or any other aqueous fluid that, preferably, does not adversely interact with the other components used in accordance with embodiments disclosed herein or with the subterranean formation.

Aqueous base fluids present in the treatment fluids may be present in an amount sufficient to substantially hydrate the water-soluble polymer to form a gel, optionally in the presence of a crosslinking agent to modulate viscosity. Suitable non-aqueous base fluids that may be used in the treatment fluids may include glycerol, glycol, polyglycols, ethylene glycol, propylene glycol, and dipropylenegylcol methyl ether. In some embodiments, the base fluid may be present in the treatment fluids of the present invention in an amount in the range from about 5% to 99.99% by volume of the treatment fluid.

In some embodiments, the base fluids suitable for use in the treatment fluids may be optionally foamed (e.g., a liquid that comprises a gas such as nitrogen or carbon dioxide). As used herein, the term "foamed" also refers to co-mingled fluids. In certain embodiments, it may desirable that the base fluid is foamed to, inter alia, reduce the amount of base fluid that is required, e.g. in water sensitive subterranean formations, to reduce fluid loss to the subterranean formation, enhance flow back of fluids, and/or to provide enhanced proppant suspension. While various gases can be utilized for foaming the fracturing fluids, nitrogen, carbon dioxide, and mixtures thereof are commonly employed in the art. In examples of such embodiments, the gas may be present in a fracturing fluid in an amount in the range of from about 5% to about 98% by volume of the treatment fluid, or in the range of from about 20% to about 80%. The amount of gas to incorporate into the fracturing fluid may be affected by factors including the viscosity of the fluid.

If desired, the treatment fluids may also be used in the form of an emulsion. An example of a suitable emulsion may comprise an aqueous base fluid comprising a gelling agent and a suitable hydrocarbon. In some embodiments, the emulsion may comprise about 30% of an aqueous base fluid and about 70% of a suitable hydrocarbon. In some embodiments, the external phase of the emulsion may be aqueous. In certain embodiments, it may be desirable to use an emulsion to, inter alia, reduce fluid loss to the subterranean formation, and/or to provide enhanced proppant suspension. Other benefits and advantages to using emulsions in the methods employing the treatment and fracturing fluids will be evident to one of ordinary skill in the art.

The treatment fluids may vary widely in density. One of ordinary skill in the art with the benefit of this disclosure will recognize the particular density that is most appropriate for a particular application. In some embodiments, the density of a non-foamed fracturing fluid may approximate the density of water. In other embodiments, the density of the non-foamed treatment fluids may range from about 8.3 pounds per gallon to about 15 ppg. One of ordinary skill in the art with the benefit of this disclosure will recognize that the density of any particular treatment fluid may also vary depending on the addition of certain additives, including, but not limited to, proppant, gas, fluid loss control additives, alcohols, glycols, and/or hydrocarbons. Furthermore, the desired density for a particular treatment fluid may depend on characteristics of the subterranean formation, including, inter alia, the hydrostatic pressure required to control the fluids of the subterranean formation during placement of the fracture fluids, and the hydrostatic pressure which will damage the subterranean formation.

In some embodiments, the treatment fluid may comprise a brine. Brines suitable for use in some embodiments may include those that comprise monovalent, divalent, or trivalent cations. Some divalent or trivalent cations, such as magnesium, calcium, iron, and zirconium, may, in some concentrations and at some pH levels, cause undesirable crosslinking of the gelling agent. If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used. Another method would be to include a chelating agent to chemically bind the problematic ions to prevent their undesirable interactions with the water soluble polymer. Suitable chelants include, but are not limited to, citric acid or sodium citrate. Other chelating agents also are suitable. Brines, where used, may be of any weight. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, mixtures thereof, and the like. Additional salts may be added to a water source, e.g., to provide a brine, and a resulting viscosified treatment fluid, having a desired density.

In some embodiments, methods disclosed herein employ treatment fluid further comprising any number of conventional additives known in the art. Such additives may be selected from the group consisting of a corrosion inhibitor, a pH control additive, a surfactant, a salt, a breaker, a fluid loss control additive, a scale inhibitor, an asphaltene inhibitor, a paraffin inhibitor, a biocide, a crosslinker, a fluid stabilizer, a chelant, a foaming agent, a defoamer, an emulsifier, a demulsifier, an iron control agent, an alcohol solvent, a mutual solvent, an oxygen scavenger, a particulate diverter, a gas, a friction reducer, an activator, a retarder, and combinations thereof.

In some embodiments, flooding methods disclosed herein may further comprise a step of removing production fluid from the wellbore prior to the treating step with chlorine dioxide. In some embodiments, it may be possible to treat production fluid in situ in the wellbore in the annular space via a sub pump or a rod pump. In some embodiments, the treating step may comprise adding an amount of chlorine dioxide in a range from about 25 mg/L to about 500 mg/L. In some embodiments, the additional hydrocarbons present in the aqueous portion which may be recovered may be up to about 20% by weight of the aqueous fraction and the treating step may reduce the hydrocarbon content in the aqueous portion to less than about 2.5%, or to less than about 0.25%. After the treating step in a flooding operation, the treated fluid may be subjected to a viscosity adjusting step which comprises forming a second polymer gel. The second polymer gel may be the same or different from the first polymer gel. That is, after retrieving additional hydrocarbons from the aqueous fraction of the production fluid, additional water soluble polymers may be added into the treated aqueous fraction to adjust the viscosity for further flooding operations. In some embodiments, the amount of additional water-soluble polymers added after chlorine dioxide treatment is substantially less than would be needed in a typical polymer flood recycle. As mentioned herein above, this may be from about 25% to about 75% reduction in the amount needed to achieve a target viscosity.

In some embodiments, there are provided treatment fluids comprising a polymer gel comprising a water-soluble polymer, a polymer gel-preserving amount of chlorine dioxide, and an aqueous base fluid. In some such embodiments, the aqueous base fluid comprises production water. As used herein, a "polymer gel-preserving amount" is an amount that accounts for any detrimental components present in the aqueous base fluid, detrimental components in the formation in which the treatment fluid will be used, or both. For example, one can measure the quantities of various damaging components in the aqueous base fluid and the formation in which the treatment fluid is to be used and estimate the amount of chlorine dioxide needed to preserve the integrity of the water-soluble polymer and polymer gel. For example, the levels of iron, manganese, and other ions of interest may be measured. The treatment fluid may then incorporate the polymer gel-preserving amount of chlorine dioxide as an amount sufficient to substantially oxidize reducing species present in the treatment fluid. Such as the reducing species comprising low oxidation state metal ions, hydrogen sulfide, and mixtures thereof. In particular, the levels of iron(II), manganese(II) and tin(II), and more generally, almost any of the reduced states of a transition metal. In particular embodiments, the treatment fluids may comprise a polymer gel-preserving amount of chlorine dioxide that is also a biocidally effective amount. In some such embodiments, the biocidally effective amount of chlorine dioxide may comprise a residual amount in a range from about 1 mg/L to about 10 mg/L. That is, enough chlorine dioxide is used to oxidize any low valent metals and still provide about 1 mg/L to about 10 mg/L additional residual chlorine dioxide to maintain biocidal activity. Additionally, the polymer gel-preserving amount of chlorine dioxide may be further adjusted to compensate for reducing species present in a subterranean formation in which the treatment fluid is to be employed. That is any reducing agent, such as hydrogen sulfide, which may be present in a formation which could reduce a transition metal to the undesired low-valent form can be accommodated for by providing a sufficient excess of chlorine dioxide.

In some embodiments, the treatment fluid is formulated particularly for polymer flooding operations. In some embodiments, treatment fluids may be formulated as fracturing fluids and as such further comprise a proppant. In particular embodiments, the treatment fluid disclosed herein may be used unfiltered. Proppants typically comprise particulate solids. Examples of suitable proppants include without limitation, sand, bauxite, sintered bauxite, silica alumina, glass beads, ceramic materials, glass materials, polymer materials, polytetrafluoroethylene materials, nut shell pieces, seed shell pieces, fruit pit pieces, wood, composite particulates, gravel, or combinations thereof. Generally, the particulate solids may have a particle size in the range of from about 2 to about 400 mesh, U.S. Sieve Series. In particular, the proppant may have a particle size in the range of from about 10 mesh to about 70 mesh, U.S. Sieve Series. More particularly, the particle size distribution ranges of the proppant may be about 10 to about 20 mesh, 20 to 40 mesh, 40 to 60 mesh or 50 to 70 mesh, depending on the particular size and distribution of formation solids to be screened out by the particulate solid pack. Although the proppant may be of any shape, the proppant generally may be spherical. However, proppants with other particulate solid shapes may also be utilized such as without limitation, ellipsoidal, platelet-shaped, toroidal, oblate spheroids, prolate spheroids, scalene spheroids, rod-like, or combinations thereof.

In some embodiments, methods that employ fracturing fluids comprise a placing step which involves applying the fracturing fluid at a sufficient pressure and at a sufficient rate to fracture the subterranean formation without causing substantial de-crosslinking. Thus, such methods may involve pumping the fracturing fluid (often as a slurry) at a pressure suitable for the conditions posed by the formation being fractured. Those skilled in the art will appreciate that an appropriate pressure and sufficient rate to fracture a subterranean formation may depend on, inter alia, bottomhole conditions and the compositional nature of the formation being fractured. For example, in some embodiments a sufficient pressure and a sufficient rate to fracture the formation may comprise pressure in a range from about 300 to about 20,000 psi and rates in a range of from about 10 bbl/min to about 150 bbl/min. One skilled in the art will recognize that these figures are merely exemplary approximations and factors such as permeability of the formation may play a role in selection of exact conditions to promote fracturing. Other factors which may impact the fracturing treatment conditions (specifically impacting the fluid/slurry) include completion dimensions (inner diameter), perforation size, perforation density, cluster spacing of perforations, the presence of screens for sand control, and the like. The exact selection of conditions for successful fracturing may be aided by computational modeling of the formation.

In some embodiments, fracturing may be combined with gravel packing operations in a process known in the art as frac-packing. In some such embodiments, methods may include introducing a screen for gravel packing and a frac-packing fluid into the wellbore. Gravel packing is a sand-control method used to prevent production of formation sand. In gravel packing operations, a metallic or ceramic screen is placed in the wellbore and the surrounding annulus is packed with prepared gravel of a specific size designed to prevent the passage of formation sand. Gravel packing operations ideally stabilize the formation while causing minimal impairment to well productivity. Suitable gravel packing fluids for use in conjunction with frac-packing, in particular, will be appreciated by those skilled in the art.

In some embodiments, an optional chemical breaker may be included in the fracturing fluids disclosed herein which breaker acts on the polymer of the polymer gel. Suitable breakers may include any breaker that can reduce the viscosity of the fracturing fluid when desired and is suitable for use in the compositions and methods disclosed herein. In some such embodiments, the breaker may comprise a delayed gel breaker that will react with the fracturing fluid after a desired delay period. Suitable delayed gel breakers can be materials that are slowly soluble in water, those that are encapsulated, or those that are otherwise designed to slowly solubilize in the fracturing fluid. In certain embodiments wherein these types of breakers are used, the breaking of the gel does not take place until the slowly soluble breakers are at least partially dissolved in the water and this may be before or after any de-crosslinking/pressure thinning. Breakers may include alkali metal carbonates, alkali metal bicarbonates, alkali metal acetates, other alkaline earth metal oxides, alkali metal hydroxides, amines, weak acids and the like can be encapsulated with slowly water soluble or other similar encapsulating materials so as to make them act after a desired delay period. Such materials are well known to those skilled in the art and may function to delay the breaking of the crosslinked gel for a required period of time. Examples of water soluble and other similar encapsulating materials that may be suitable include, but are not limited to, porous solid materials such as precipitated silica, elastomers, polyvinylidene chloride (PVDC), nylon, waxes, polyurethanes, polyesters, cross-linked partially hydrolyzed acrylics and the like. In certain embodiments, when a polyvalent metal salt of an organophosphonic acid ester and an alkaline breaker are utilized, e.g., magnesium oxide, an initial increase in the viscosity of the fracturing fluid may be achieved, after which the gel may be further broken. If used, the delayed gel breaker may be present in the fracturing fluid in an amount in the range of from about 0.01% to about 3% w/v, or in an amount in the range of from about 0.05% to about 1% w/v. "w/v" as used herein refers to the weight of the component based on the volume of the liquid that is present in the fracturing fluid.

In some embodiments, there are provided methods comprising introducing a treatment fluid into a wellbore penetrating a subterranean formation, the treatment fluid comprising a polymer gel comprising a water-soluble polymer, a proppant, and a polymer gel-preserving amount of chlorine dioxide, wherein the placing step comprises applying the treatment fluid at a sufficient pressure and at a sufficient rate to fracture the subterranean formation.

Fracturing operations may be combined with gravel packing operations in a technique known as frac-packing, which combined operations are designed provide both a barrier to formation sand production as well as proppant flowback. In some embodiments, fracturing operations are conducted with a treatment fluid that comprises production water and a polymer gel-preserving amount of chlorine dioxide is an amount sufficient to substantially oxidize reducing species present in the production water. In some embodiments, the polymer gel-preserving amount of chlorine dioxide may be further adjusted by estimating the amount of reducing species present in the subterranean formation being fractured. In some embodiments, iron (III) ions are present in the fracturing fluid when initially formulated and remain in the treatment fluid during the introducing step. That is, there is no need to remove iron (III) or other oxidized metals when employing treatment fluids disclosed herein, especially when excess residual chlorine dioxide is employed.

A flooding or fracturing operation may include introducing a treatment fluid, according to embodiments disclosed herein, into a subterranean formation. Other operations which indicate the use of polymer gel compositions may be performed with substantially similar treatment fluids. Such operations may include fluid loss treatments, diverting operations, and the like. Further, any of the methods disclosed herein may be performed in a wellbore that is vertical, horizontal, or deviated. In some embodiments, a wellbore may comprise a combination of vertical horizontal and deviated portions. In some embodiments, methods disclosed herein may be performed in a subterranean formation that is offshore.

To facilitate a better understanding of the present embodiments, the following Examples are provided. In no way should the following Examples be read to limit, or to define, the scope of the embodiments disclosed herein.

EXAMPLE 1

This Example shows the recovery of additional hydrocarbon by treatment of produced fluid with chlorine dioxide.

A sample of produced fluid from a polyacrylamide polymer flood that had been in operation for over 12 months that was taken downstream of the water knockout and was tested by thermal separation (retort). The fluid was found to contain 16% by weight petroleum hydrocarbon 2% by weight insoluble solids with the remainder being water. Portions of the sample were treated with 25, 50, 75, and 100 mg/L chlorine dioxide. All samples treated with chlorine dioxide exhibited a clean hydrocarbon water break within five minutes. The samples were further analyzed to determine hydrocarbon content. At the 100 ppm dosage of chlorine dioxide the water layer was determined to contain less than 0.25% hydrocarbon. At 25, 50, and 75 mg/L chlorine dioxide dosage the water was found to contain 2.5%, 2.1% and <0.25% hydrocarbon, respectively.

EXAMPLE 2

This Example shows the reduction in viscosity of produced fluid upon treatment with chlorine dioxide.

Untreated sample from Example 1 was examined using a Brookfield viscometer to determine the viscosity of the fluid. The samples of the chlorine dioxide treated fluid were also examined. The results are shown in Table 1.

TABLE 1

Viscosity @ 20 c. +/- 3 cp

| Treatment | 6 RPM | 12 RPM | 30 RPM | 60 RPM |
| --- | --- | --- | --- | --- |
| untreated full | 175 cp | 165 cp | 150 cp | >100 cp maxed out |
| 25 ppm | 10 | 10 | 8 | 10 |
| 50 ppm | 10 | 5 | 10 | 10 |
| 75 ppm | 5 | 5 | 6 | 8 |
| 100 ppm | 5 | 5 | 8 | 8 |

Chlorine dioxide treatment reduced the viscosity of the resultant fluid by greater than 90 percent.

EXAMPLE 3

This Example shows the adjustment of the viscosity of the water layer from Example 1.

The water layers from the solutions in Example 1 were treated with polyacrylamide polymer. The polymer was hydrated at concentrations of 1500, 2000, and 2500 mg/L and compared to an untreated sample with respect to viscosity. Referring to Table 2, the fluid that was treated with chlorine dioxide resulted in a far superior polymer hydration to the untreated fluid. In the chlorine dioxide treated fluid less than 50% of the polymer was required to achieve similar viscosities when compared to the fluid that was not treated by chlorine dioxide.

TABLE 2

Viscosity with polymer

| ClO$_2$ ppm | Polymer | 6 rpm Viscosity | 12 rpm Viscosity | 30 rpm Viscosity | 60 rpm Viscosity |
| --- | --- | --- | --- | --- | --- |
| 10 | 1500 | 130 | 105 | 76 | 61 |
| 10 | 2000 | 220 | 165 | 110 | 82 |
| 10 | 2500 | 350 | 255 | 158 | Max |
| 25 | 1500 | 120 | 100 | 72 | 57 |
| 25 | 2000 | 250 | 190 | 126 | 94 |
| 25 | 2500 | 395 | 285 | 178 | Max |
| 50 | 1500 | 110 | 90 | 66 | 55 |
| 50 | 2000 | 205 | 160 | 108 | 83 |
| 50 | 2500 | 360 | 260 | 168 | Max |
| 75 | 1500 | 120 | 100 | 70 | 57 |
| 75 | 2000 | 200 | 150 | 98 | 73 |
| 75 | 2500 | 350 | 350 | Max | Max |
| 0 | 1500 | 40 | 35 | 32 | 34 |
| 0 | 2000 | 70 | 70 | 58 | 53 |
| 0 | 2500 | 140 | 125 | 98 | 89 |

TABLE 2-continued

Viscosity with polymer

| ClO$_2$ ppm | Polymer | 6 rpm Viscosity | 12 rpm Viscosity | 30 rpm Viscosity | 60 rpm Viscosity |
| --- | --- | --- | --- | --- | --- |
| 50 | 300 | 15 | 12.5 | 13 | 15 |
| 50 | 400 | 20 | 17.5 | 16 | 18 |
| 50 | 500 | 25 | 20 | 18 | 21 |
| 50 | 600 | 25 | 20 | 22 | 23 |
| 50 | 700 | 30 | 30 | 26 | 29 |
| 50 | 800 | 40 | 35 | 30 | 29 |
| 50 | 900 | 55 | 50 | 38 | 36 |

EXAMPLE 4

This Example shows improved recovery of hydrocarbon from produced fluid upon treatment with chlorine dioxide.

A produced fluid from a polyacrylamide polymer flood was treated with 400 mg/L chlorine dioxide. Prior to treatment the fluid contained about 15% by volume hydrocarbon; sand and other solids approximating 10% with the remainder consisting of brine. Prior to treatment with chlorine dioxide the fluid was predominantly homogeneous. After treatment with chlorine dioxide the fluid broke into distinct layers. Approximately 65% of the hydrocarbon was recoverable by skimming in stilling tanks. Approximately 90% of the solids settled out of the water phase. All sulfides were eliminated from all phases of the fluid stream.

EXAMPLE 5

This Example shows the improved gel performance of chlorine dioxide treated water compared to untreated water.

Polymer was added to the untreated fluid and the water portion of the treated fluid from Example 4. It should be noted that the water layer from the treated fluid still contained about 4% highly emulsified hydrocarbon. The polyacrylamide polymer was added to each of the fluids as indicated in the data in Table 3.

TABLE 3

| | Polymer Concentration (ppm) | Viscosity (cP) |
| --- | --- | --- |
| Untreated produced water | | |
| 1 | 1500 | 26 |
| 2 | 2000 | 50.5 |
| 3 | 2500 | 86 |
| Treated with chlorine dioxide (400 mg/L) | | |
| 4 | 1500 | 47 |
| 5 | 2000 | 78.5 |
| 6 | 2500 | 200 |

The results demonstrate a 50 to 200% increase in performance of the polymer for viscosity increase in the fluid that has been treated with chlorine dioxide.

EXAMPLE 6

This Example shows general conditions for preparing hydrated polymer samples.

A sample of a polyacrylamide polymer was hydrated in deionized water. In this and the following Examples the polymer was hydrated by gentle mixing at approximately 100 RPM in a low sheer mixer. The viscosity of the hydrated polymer was determined using a Brookfield viscometer. The viscosity of the resulting product was determined to be 730 centipoises. As with all following Examples the viscosity was determined at 74° F. and a final Solution pH of between 7.1 and 7.4.

EXAMPLE 7

This Example shows the effect of iron (II) on the viscosity of polyacrylamide polymer.

20 mg/L of iron (II) chloride was added to a sample and deionized water and 1500 mg/L of a polyacrylamide polymer and allowed to hydrate. The resulting solution was analyzed using a Brookfield viscometer and the viscosity of the solution was determined to be less than 15 centipoises.

EXAMPLE 8

This Example shows the effect of iron (III) on the viscosity of polyacrylamide polymer.

20 mg/L of iron (III) chloride was added to deionized water along with 1500 mg/L of a polyacrylamide polymer and allowed to hydrate. The resultant solution was analyzed using a Brookfield viscometer. The resultant solution had a viscosity of 750 centipoises.

Examples 7 and 8 indicate that ferrous ion (Fe (II)) is responsible for polymer degradation, while ferric ion (Fe (III)) is relatively innocuous. Thus, the presence of ferric ion is apparently not detrimental to the stability of the polymer gel. This observation indicates that the costly and tedious filtration normally employed to remove iron after oxidation and flocculation is unnecessary.

EXAMPLE 9

This Example shows the effect of chlorine dioxide treatment on viscosity in the presence of iron (II).

50 mg/L of chlorine dioxide, 20 mg/L iron (II) chloride and 1500 mg/L of a polyacrylamide polymer was added to a solution in deionized water. The polymer was allowed to hydrate and was analyzed with a Brookfield viscometer. The solution was determined to have a viscosity of 420 centipoises.

EXAMPLE 10

This Example shows the preparation of a treatment fluid in the absence of iron salts at 50 mg/L chlorine dioxide.

50 mg/L of chlorine dioxide was added to deionized water along with 1500 mg/L of a polyacrylamide polymer. The polymer was allowed to hydrate. The viscosity of the resulting solution was determined using a Brookfield viscometer. The solution was determined to have a viscosity of 460 centipoises.

EXAMPLE 11

This Example shows the preparation of a treatment fluid in the absence of iron salts at 100 mg/L chlorine dioxide.

100 mg/L of chlorine dioxide was added to deionized water with 1500 mg/L of a polyacrylamide polymer. The polymer was allowed to hydrate. The resultant solution was analyzed using a Brookfield viscometer. The resulting viscosity of the solution was 440 centipoises.

EXAMPLE 12

This Example shows the preparation of a treatment fluid in the absence of iron salts at 150 mg/L chlorine dioxide.

150 mg/L of chlorine dioxide was added to deionized water along with 1500 mg/L of a polyacrylamide polymer. The solution was allowed to hydrate and then analyzed using a Brookfield viscometer. The resultant solution had a viscosity of 580 centipoises.

EXAMPLE 13

This Example shows the preparation of a treatment fluid in the absence of iron salts at 200 mg/L chlorine dioxide.

200 mg/L of chlorine dioxide was added to deionized water along with 1500 mg/L of a polyacrylamide polymer. The polymer was allowed to hydrate. The resulting solution was tested with a Brookfield viscometer and determined to have a viscosity of about 490 centipoises.

EXAMPLE 14

This Example shows the formation of a treatment fluid from production water without chlorine dioxide treatment.

A sample of typical Permian basin produced water was obtained. The water was analyzed and determined to contain 25 mg/L of iron as iron two and various other metals. 1500 mg/L of a polyacrylamide polymer was added to the solution. The polymer was allowed to hydrate. The viscosity of the solution was determined using a Brookfield viscometer. The resulting solution had a viscosity of 12 centipoises.

EXAMPLE 15

This Example shows the formation of a treatment fluid from production water with prior chlorine dioxide treatment.

An identical sample as Example 14 was prepared, with the exception that prior to addition of the polymer, 50 mg/L of chlorine dioxide was added and allowed to react for five minutes. The solution had a residual of approximately 20 mg/L chlorine dioxide. After the polymer hydrated the fluid was tested with the Brookfield viscometer and it was determined that the fluid had a viscosity of 430 centipoises.

EXAMPLE 16

This Example shows the formation of a treatment fluid from production fluid without chlorine dioxide treatment. Production fluid includes iron (II) and hydrocarbons.

A sample of a typical Permian basin produce fluid was tested and determined to contain 45 mg/L of iron as iron (II) and 320 mg/L total petroleum hydrocarbons. The solution was treated with 50 mg/L chlorine dioxide and allowed to react for five minutes. The chlorine dioxide residual was determined to be 12 mg/L. 1500 mg/L of a polyacrylamide polymer was added to the treated solution. The polymer was allowed to hydrate. The resulting solution was tested by a Brookfield viscometer and determined to have a viscosity of 390 centipoises.

EXAMPLE 17

This Example shows the formation of a treatment fluid from production water from a water flood.

Samples of produced water from an intermediate crude water flood that contained approximately 15 mg/L iron (II) were dosed with 1500 mg/L, 2000 mg/L and 2500 mg/L of a polyacrylamide polymer and allowed to hydrate. The samples were tested with a Brookfield viscometer and found to have viscosities of 26 cP, 50.5 cP and 86 cP, respectively. An identical group of samples were treated with 50 mg/L of chlorine dioxide and dosed with the same levels of polymer. The samples were analyzed with a Brookfield viscometer and found to have viscosities of 47 cP, 78.5 cP, and 200 cP, respectively.

EXAMPLE 18

This Example shows the formation of a treatment fluid from production water with hydroxypropyl guar as the water-soluble polymer.

A sample of Permian produced water that contained approximately 82 mg/L of iron II and 26 mg/L sulfide was dosed with 5000 mg/L of hydroxypropyl guar (HPG). The mixture was allowed to hydrate and analyzed by a Brookfield viscometer. The resultant viscosity was about 16 cP. A sample of the same fluid was dosed with 150 mg/L chlorine dioxide and allowed to react for 15 minutes. The resultant solution had a residual of 6 mg/L chlorine dioxide. 5000 mg/L of HPG was added to the treated sample and allowed to hydrate. The resultant mixture was analyzed by Brookfield viscometer and found to have a viscosity of 107 cP.

EXAMPLE 19

This Example shows the formation of a treatment fluid from production water with hydroxyethyl cellulose (HEC) as the water-soluble polymer.

A sample of Permian produced water that contained approximately 82 mg/L of iron II and 26 mg/L sulfide was dosed with 5000 mg/L of hydroxyethylcellulose (HEC). The mixture was allowed to hydrate and analyzed by a Brookfield viscometer. The resultant viscosity was 12 cP. A sample of the same fluid was dosed with 150 mg/L chlorine dioxide and allowed to react for 15 minutes. The resultant solution had a residual of 6 mg/L chlorine dioxide. 5000 mg/L of HEC was added to the treated sample and allowed to hydrate. The resultant mixture was analyzed by Brookfield viscometer and found to have a viscosity of 147 cP.

EXAMPLE 20

In this Example, changes in viscosities of hydroxypropyl guar gum slurry hydrated in a fresh water sample were determined with the addition of various oxidizers and biocidal agents.

All water samples and reagents were maintained at room temperature prior to all testing. Chlorine dioxide, $ClO_2$, was prepared and the concentration of $ClO_2$, $[ClO^{2-}]$ and $Cl_2$ was measured the same day testing took place. The $ClO_2$ demand for the fresh water sample used was calculated and averaged over four measurements. Frac-Chem hydroxypropyl guar gum was used as the active polymer in this Example at a concentration of 3000 ppm.

Fresh water samples were provided in 55 gallon Drums. The water sample was agitated prior to collecting 1000 mL samples. A hand pump was used to dispense the fresh water by filling a 1000 mL volumetric flask to the calibration mark. Sample water was then transferred to a 1000 mL Pyrex wide mouth sample jar. The total sample volume was then adjusted to account for volumes added pre-hydration. Biocides and/or oxidizers were added to the water samples at concentrations provided and mixed briefly using a stir rod prior to addition of polymer. Liquid polymer was added to the sample via 10 mL disposable syringe.

Hydration of the polymer was achieved using a bench top multiple speed drive belt drill press and a 12" spindle with two 2" tri-blade impellers, approximately 4" apart. The spindle was lowered into solution until the bottom impeller touched the bottom of the vessel and backed off slightly. The sample was then hydrated for a total time of 5 minutes. Following hydration the sample was poured from one jar to another a total of two times to eliminate any surface build up or trapped air that may have accumulated during hydration. The viscosity of the sample was then immediately measured using a Brookfield LVF viscometer with a 3½" Length×1" Dia. cylindrical spindle at rotational speeds of 6, 12 and 30 rpm. The torque read off the viscometer was then converted to viscosity, in units of centipoise, according to the manufacturers guidelines. Based on the nature of this Example, the manufacturers recommended glassware was not feasible for use. Because of this, the calculated conversion between torque and viscosity used by the manufacturer would not result in a true conversion to the accurate viscosity. This is not a concern because all values are used on a relative scale under the same conditions for each trial.

Baseline runs were conducted by hydrating 3000 ppm of polymer in a 1000 mL fresh water sample. Following the baseline trials, reagents were added according to Tables 4-17 below.

TABLE 4

| $ClO_2$ (ppm) Residual | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 5 | 35 | 36.5 | 38 | 35 | 35 | 37 |
| 10 | 55 | 53 | 53 | 52 | 52.5 | 50 |
| 15 | 55 | 55 | 56 | 55 | 55 | 54 |
| 20 | 45 | 45 | 46 | 45 | 45 | 48 |
| 25 | 50 | 47.5 | 50 | 45 | 45 | 44 |
| 50 | 53 | 52 | 52 | 45 | 45 | 44 |

TABLE 5

| Dazomet (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 150 | 25 | 22.5 | 22 | 23 | 22.5 | 26 |
| 200 | 17 | 17.5 | 21 | 23 | 20 | 22 |

TABLE 5-continued

| Dazomet (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
| --- | --- | --- | --- | --- | --- | --- |
| 300 | 10 | 10 | 12 | 10 | 12.5 | 14 |
| 400 | 10 | 10 | 12 | 15 | 12.5 | 12 |
| 500 | 15 | 12.5 | 13 | 15 | 12.5 | 11 |
| 625 | 13 | 10 | 10 | 15 | 12.5 | 10 |
| 700 | 12 | 12.5 | 11 | 10 | 10 | 11 |

TABLE 6

| Peracetic Acid (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
| --- | --- | --- | --- | --- | --- | --- |
| 0 (Baseline) | 25 | 25 | 26 | 20 | 20 | 20 |
| 400 | 55 | 55 | 55 | 35 | 30 | 31 |
| 500 | 50 | 50 | 50 | 55 | 57 | 51 |
| 600 | 45 | 47 | 52 | 50 | 47.5 | 48 |
| 700 | 45 | 45 | 47 | 40 | 42 | 44 |
| 800 | 50 | 50 | 52 | 45 | 45 | 46 |
| 900 | 40 | 38 | 38 | 43 | 38 | 40 |
| 1000 | 55 | 57.5 | 59 | 40 | 38 | 39 |
| 1200 | 55 | 55 | 55 | 45 | 45 | 45 |

TABLE 7

| Glutaraldehyde (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
| --- | --- | --- | --- | --- | --- | --- |
| 0 (Baseline) | 25 | 25 | 26 | 20 | 20 | 20 |
| 150 | 28 | 30 | 30 | 40 | 50 | 55 |
| 250 | 45 | 40 | 38 | 35 | 25 | 30 |
| 350 | 25 | 25 | 28 | 45 | 43 | 44 |
| 500 | 30 | 30 | 31 | 40 | 40 | 42 |

TABLE 8

| DBNPA (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
| --- | --- | --- | --- | --- | --- | --- |
| 0 (Baseline) | 25 | 25 | 26 | 20 | 20 | 20 |
| 150 | 25 | 27.5 | 30 | 23 | 22.5 | 26 |
| 200 | 25 | 25 | 30 | 23 | 25 | 28 |
| 300 | 25 | 25 | 28 | 30 | 35 | 38 |
| 400 | 20 | 25 | 27 | 30 | 25 | 28 |
| 450 | 25 | 25 | 30 | 25 | 25 | 28 |

TABLE 9

| Bleach Active Cl (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
| --- | --- | --- | --- | --- | --- | --- |
| 0 (Baseline) | 25 | 25 | 26 | 20 | 20 | 20 |
| 10 | 15 | 10 | 12 | 15 | 12.5 | 12 |
| 15 | 10 | 11 | 11 | 13 | 10 | 11.4 |
| 20 | 10 | 10 | 10 | 15 | 10 | 11 |
| 25 | 15 | 10 | 10 | 10 | 10 | 10 |
| 50 | 10 | 8 | 9 | 10 | 8 | 8 |

TABLE 10

| Sodium Chlorite (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 5 | 30 | 30 | 33 | 30 | 25 | 28 |
| 10 | 25 | 25 | 30 | 30 | 30 | 32 |
| 15 | 30 | 30 | 29 | 30 | 25 | 29 |
| 20 | 25 | 25 | 26 | 20 | 20 | 26 |
| 50 | 30 | 30 | 27 | 25 | 27 | 30 |

TABLE 11

| Sodium Chlorate (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 25 | 40 | 42.5 | 40 | 40 | 41 | 43 |
| 50 | 25 | 25 | 28 | 25 | 25 | 28 |
| 75 | 20 | 27.5 | 29 | 25 | 22.5 | 26 |
| 100 | 20 | 22 | 26 | 30 | 23 | 27 |
| 200 | 25 | 25 | 26 | 20 | 25 | 27 |

TABLE 12

| Sodium Persulfate (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 25 | 15 | 13 | 19 | 20 | 22 | 20 |
| 50 | 20 | 18 | 18 | 20 | 20 | 21 |
| 75 | 20 | 15 | 18 | 20 | 19 | 20 |
| 100 | 15 | 15 | 18 | 20 | 21 | 21 |

TABLE 13

| Sodium Perborate (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 25 | 10 | 10 | 9 | 10 | 10 | 9 |
| 50 | 15 | 8 | 8 | 15 | 10 | 8 |
| 75 | 10 | 10 | 9 | 15 | 10 | 9 |
| 100 | 10 | 9 | 8 | 10 | 10 | 9 |

TABLE 14

| 80/20 $ClO_2/Cl_2$ (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 5/1 | 50 | 50 | 50 | 45 | 45 | 46 |
| 10/2 | 47 | 50 | 50 | 40 | 40 | 40 |
| 15/3 | 53 | 51 | 48 | 45 | 45 | 43 |
| 20/4 | 50 | 57 | 51 | 40 | 40 | 40 |
| 100/20 | 40 | 40 | 40 | 40 | 40 | 35 |

TABLE 15

| THPS (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 100 | 75 | 77 | 74 | 40 | 45 | 42 |

TABLE 15-continued

| THPS (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 150 | 70 | 68 | 66 | 50 | 50 | 50 |
| 200 | 65 | 66 | 68 | 45 | 50 | 46 |
| 250 | 55 | 57.5 | 59 | 55 | 55 | 53 |
| 300 | 60 | 60 | 60 | 45 | 45 | 44 |
| 400 | 50 | 50 | 49 | 40 | 40 | 40 |

TABLE 16

| Adjusted 80/20 $ClO_2/Cl_2$ (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 8/2 | 40 | 47 | 48 | 40 | 40 | 43 |
| 16/4 | 50 | 53 | 51 | 45 | 38 | 40 |
| 80/20 | 50 | 53 | 54 | 45 | 45 | 44 |

TABLE 17

| 60/40 $ClO_2/Cl_2$ (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|
| 0 (Baseline) | 25 | 25 | 26 | 20 | 20 | 20 |
| 5/5 | 30 | 35 | 38 | 45 | 40 | 41 |
| 10/10 | 65 | 58 | 56 | 40 | 40 | 40 |
| 50/50 | 60 | 52.5 | 52 | 40 | 42.5 | 40 |

Tables 4 to 17 summarize data showing the viscosifying effects of various the various agents. Unexpectedly, the ability of the biocidal agent to viscosify the fluid does not appear to trend according to oxidizing strength. Even more unexpectedly, some biocidal agents, such as THPS, having essentially no oxidizing capacity still appear to provide a beneficial viscosifying effect.

EXAMPLE 21

This Examples shows the viability of formulating a premix of polymer and biocide before hydrating the polymer.

Biocides that demonstrated an improvement in viscosity in Example 20 were combined with dry hydroxypropyl guar gum, Frac-Chem hydroxypropyl guar gum slurry or polyacrylamide prior to introduction to the fresh water sample. The procedure closely follows that outlined above with a few alterations. Dry guar and dry sodium chlorate were weighed out individually and kept separate until the sample was ready for hydration. The dry powders were then combined and gently mixed using a stir rod for a few seconds. The fresh water sample was then mixed using the hydration apparatus outlined above and the mixed powders were carefully introduced to the agitated sample and hydrated for 5-minutes. The dry polyacrylamide powder was handled in the same fashion and hydrated for a period of 1-hour. Viscosity measurements for polyacrylamide were also taken at 24 and 48-hours post-hydration to determine if degradation of polymer was present. The guar slurry was measured to the appropriate volume using a 10 ml syringe. The tip of the syringe was then plugged and the dry or liquid biocide was introduced through the rear of the syringe by removing the plunger. The plug was then removed and the polymer/biocide mixture was delivered to the sample water and hydrated as noted previously for 5-minutes. Following the hydration period the viscosity of the solution was measured as noted previously. Results are summarized below in Tables 18 to 26.

TABLE 18

| Sodium Chlorate (ppm) | Dry HPG (ppm) | pH Post Hyd. | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|---|
| 0 | 3000 | 7.9 | 160 | 145 | 156 | 150 | 150 | 152 |
| 15 | 3000 | 7.9 | 145 (91%) | 165 (114%) | 168 (108%) | 160 (107%) | 150 (100%) | 140 (92%) |
| 25 | 3000 | 7.92 | 155 (97%) | 170 (117%) | 160 (103%) | 135 (90%) | 175 (117%) | 15 (104%) |
| 35 | 3000 | 7.94 | 155 (97%) | 180 (124%) | 174 (112%) | 170 (113%) | 185 (123%) | 174 (114%) |

Dry mix before hydration; 5 minute hydration.

TABLE 19

| Sodium Chlorate (ppm) | Poly-acrylamide (ppm) | pH Post Hyd. | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|---|
| 0 | 1500 | 8 | 250 | 225 | 150 | 250 | 200 | 132 |
| 15 | 1500 | 8.09 | 190 (76%) | 185 (82%) | 128 (85%) | 200 (80%) | 175 (88%) | 128 (97%) |
| 25 | 1500 | 7.98 | 250 (100%) | 198 (88%) | 136 (91%) | 250 (100%) | 200 (100%) | 138 (105%) |
| 35 | 1500 | 8.1 | 270 (108%) | 168 (75%) | 124 (83%) | 240 (96%) | 190 (95%) | 128 (97%) |

Dry mix before hydration; one hour hydration

TABLE 20

| Sodium Chlorate (ppm) | Poly-acrylamide (ppm) | pH Post Hyd. | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|---|
| 0 | 1500 | N/A | 155 | 223 | 148 | 170 | 155 | 125 |
| 15 | 1500 | N/A | 150 (97%) | 165 (74%) | 134 (91%) | 120 (71%) | 170 (110%) | 128 (102%) |
| 25 | 1500 | N/A | 120 (77%) | 190 (85%) | 132 (89%) | 190 (112%) | 175 (113%) | 129 (103%) |
| 35 | 1500 | N/A | 80 (52%) | 120 (54%) | 116 (78%) | 190 (112%) | 170 (110%) | 128 (102%) |

Dry mix before hydration; one hour hydration

TABLE 21

| Sodium Chlorate (ppm) | Frac-Chem HPG Slurry (ppm) | pH Post Hyd. | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|---|
| 0 | 3000 | 8.59 | 65 | 80 | 64 | 65 | 48 | 39 |
| 15 | 3000 | 8.59 | 70 (108%) | 58 (73%) | 50 (78%) | 75 (115%) | 60 (125%) | 60 (154%) |
| 25 | 3000 | 8.59 | 70 (108%) | 55 (69%) | 48 (75%) | 80 (123%) | 52.5 (109%) | 53 (136%) |
| 35 | 3000 | 8.59 | 90 (138%) | 55 (69%) | 41 (64%) | 95 (146%) | 65 (135%) | 57 (146%) |

TABLE 22

| Sodium Chlorate (ppm) | Frac-Chem HPG Slurry (ppm) | pH Post Hyd. | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|---|
| 0 | 3000 | 8.59 | 75 | 53 | 46 | 60 | 55 | 55 |
| 15 | 3000 | 8.59 | 105 (140%) | 50 (94%) | 43 (93%) | 95 (158%) | 50 (91%) | 46 (84%) |
| 25 | 3000 | 8.59 | 50 (67%) | 45 (85%) | 50 (109%) | 60 (100%) | 52 (95%) | 54 (98%) |
| 35 | 3000 | 8.59 | 50 (67%) | 45 (85%) | 48 (104%) | 75 (125%) | 65 (118%) | 64 (116%) |

Mix chlorate into slurry before hydration; 5 minute hydration

TABLE 23

| Dazomet (ppm) | Frac-Chem HPG Slurry (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|
| 150 | 3000 | 65 | 40 | 28 | 65 | 45 | 34 |

TABLE 24

| THPS (ppm) | Frac-Chem HPG Slurry (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|
| 150 | 3000 | 115 | 70 | 62 | 105 | 68 | 58 |

TABLE 25

| Peracetic Acid (ppm) | Frac-Chem HPG Slurry (ppm) | Sample 1 (6 rpm) (cp) | Sample 1 (12 rpm) (cp) | Sample 1 (30 rpm) (cp) | Sample 2 (6 rpm) (cp) | Sample 2 (12 rpm) (cp) | Sample 2 (30 rpm) (cp) |
|---|---|---|---|---|---|---|---|
| 500 | 3000 | 75 | 42.5 | 23 | 55 | 35 | 20 |

In Tables 18-22 the number in parenthesis is percentage relative to baseline. As can be seen from the above tabulated data, THPS and sodium chlorate are particularly suited to dry-blending as a pre-mix.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method comprising
   (i) introducing and mixing a dose of about 100 ppm to about 400 ppm tetrakis (hydroxymethyl) phosphonium sulfate (THPS) into an aqueous base fluid to make a THPS-containing aqueous base fluid,
   (ii) mixing about 1,000 ppm to about 5,000 ppm of a water soluble polymer with the THPS-containing aqueous base fluid to form a viscosified composition, wherein, immediately following the mixing of the water soluble polymer with the THPS-containing aqueous base fluid, the viscosified composition has an increased viscosity compared with that of a corresponding baseline composition that is made without introducing THPS into the aqueous base fluid, and
   (iii) introducing a treatment fluid comprising the viscosified composition into a wellbore penetrating a subterranean formation,
   wherein the water soluble polymer is guar, a guar derivative, or a polyacrylamide.

2. The method of claim 1, wherein the treatment fluid is a fracturing fluid.

3. The method of claim 1, wherein the treatment fluid is a polymer flooding fluid.

4. The method of claim 1, wherein the treatment fluid is a diverting fluid.

5. The method of claim 1, wherein the treatment fluid is a gravel pack fluid.

6. The method of claim 1, wherein the treatment fluid is a fluid loss control fluid.

7. The method of claim 1, wherein the treatment fluid is a perforating fluid.

8. The method of claim 1, wherein the viscosified composition is a gel.

9. The method of claim 1, wherein, immediately following the mixing of the water soluble polymer with the THPS-containing aqueous base fluid, the viscosified composition has a viscosity that is at least twice that of a corresponding baseline composition that does not include THPS.

10. The method of claim 1, wherein the water soluble polymer is hydroxypropyl guar (HPG).

11. The method of claim 10, wherein, immediately following the mixing of the water soluble polymer with the THPS-containing aqueous base fluid, the viscosified composition has a viscosity that is at least twice that of a corresponding baseline composition that does not include THPS.

12. The method of claim 1, wherein the mixing of the water soluble polymer with the THPS-containing aqueous base fluid is performed for at least 5 minutes.

13. The method of claim 1, wherein the method does not comprise contacting the water soluble polymer with a cross linking agent.

14. The method of claim 1, wherein the viscosified composition is made on the fly such that the treatment fluid is continuously introduced into the wellbore as the viscosified composition is being made.

15. A method comprising
   (i) introducing about 100 ppm to about 400 ppm tetrakis (hydroxymethyl) phosphonium sulfate (THPS) and about 1,000 ppm to about 5,000 ppm of a water soluble polymer into an aqueous base fluid to form a combination that consists essentially of THPS, the water soluble polymer, and the aqueous base fluid, and mixing the combination to form a viscosified composition, wherein, immediately following the mixing the viscosified composition has an increased viscosity compared with that of a corresponding baseline composition that is made without introducing THPS, and (ii) introducing the viscosified composition into a wellbore penetrating a subterranean formation, wherein the water soluble polymer is guar, a guar derivative, or a polyacrylamide.

16. The method of claim 15, wherein the viscosified composition is a gel.

17. The method of claim 15, wherein the water soluble polymer is hydroxypropyl guar (HPG).

18. The method of claim 17, wherein the viscosified composition is a gel.

19. The method of claim 15, wherein, immediately following the mixing, the viscosified composition has a viscosity that is at least twice that of a corresponding baseline composition that does not include THPS.

20. The method of claim 17, wherein, immediately following the mixing, the viscosified composition has a viscosity that is at least twice that of a corresponding baseline composition that does not include THPS.

21. The method of claim 15, wherein the viscosified composition is made on the fly such that it is continuously introduced into the wellbore as the viscosified composition is being made.

* * * * *